United States Patent [19]

Citrin

[11] 4,176,671

[45] Dec. 4, 1979

[54] FAST RESPONSIVE VALVE

[75] Inventor: Paul S. Citrin, Danbury, Conn.

[73] Assignee: Indicon Inc., Brookfield Center, Conn.

[21] Appl. No.: 879,532

[22] Filed: Feb. 21, 1978

[51] Int. Cl.$^2$ ............................................. F16K 31/02
[52] U.S. Cl. .................................. 137/1; 137/624.15; 137/624.2; 251/7
[58] Field of Search ............... 137/624.13, 624.15, 137/624.2, 624.18, 1, 14; 251/7

[56] References Cited

U.S. PATENT DOCUMENTS

| 3,185,153 | 5/1965 | Leucci | 137/624.15 X |
| 3,490,337 | 1/1970 | Klein | 137/624.2 X |
| 3,511,469 | 5/1970 | Bell | 251/7 |

Primary Examiner—Alan Cohan
Attorney, Agent, or Firm—St. Onge, Steward, Johnston, Reens & Noë

[57] ABSTRACT

A valve is described capable of rapid actuations. The valve includes a drive element disposed to pinchingly engage a collapsible tube at a high reciprocating speed. A follower is disposed on the other side of the tube and effectively coupled for reciprocation and cooperative movement with the drive element to maintain the tube pinched off. Control means and holder are provided to open the valve by retaining the follower at just that time when the follower is at a favorable reciprocated position so that further reciprocation by the drive element can open the tube. A normally open valve is also described and a control for operation of a plurality of valves is disclosed.

11 Claims, 7 Drawing Figures

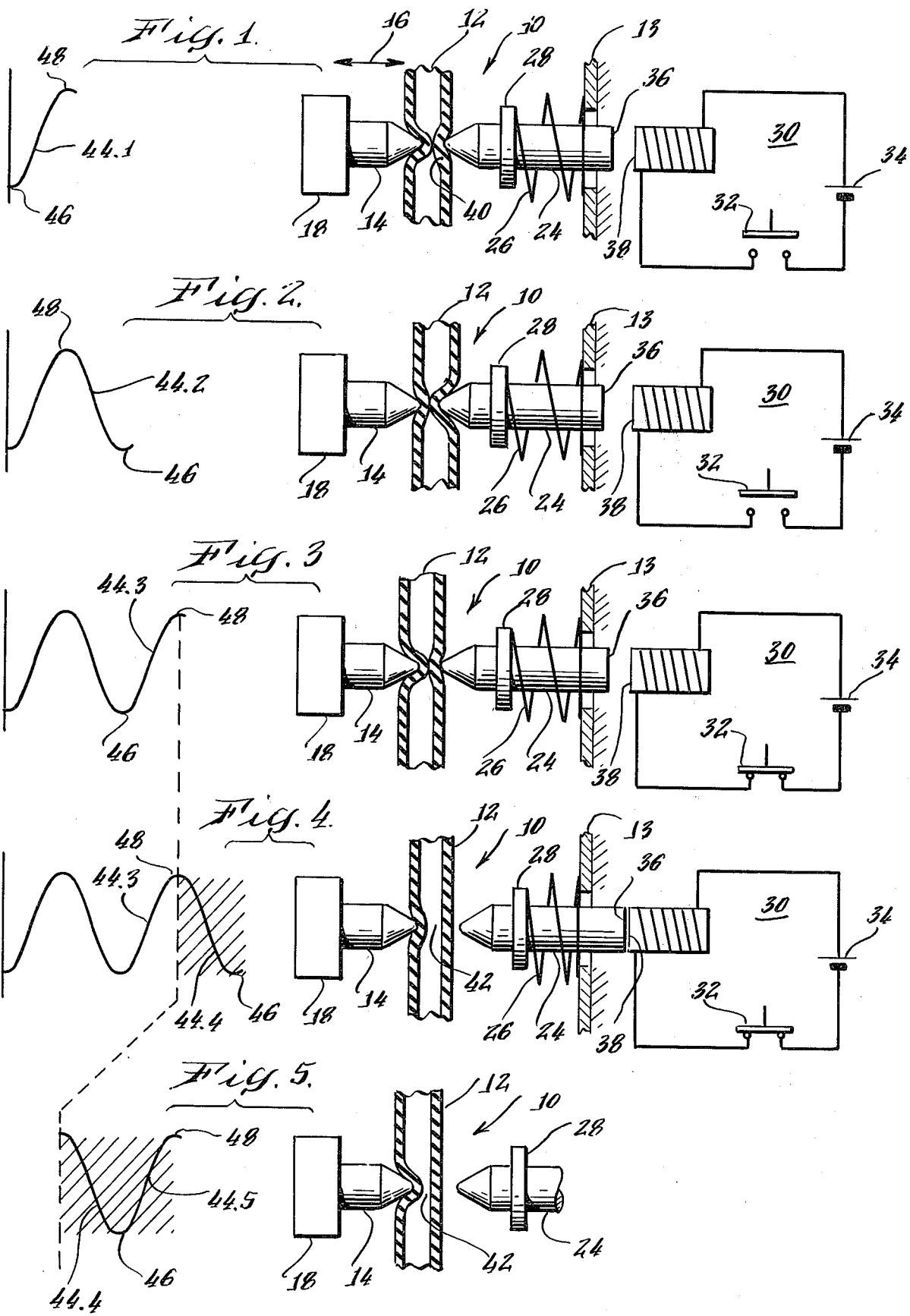

FAST RESPONSIVE VALVE

FIELD OF THE INVENTION

This invention relates to valves. More specifically, this invention relates to valves of the pinchable tube type.

BACKGROUND OF THE INVENTION

Pinch valves are well known in the art. See, for example, my U.S. Pat. No. 3,982,724. Typically, such valve employs a collapsible tube which is pinched by a drive element against a fixed stop. The drive element may be actuated pneumatically or electrically in a reciprocating manner.

Of particular interest is the U.S. Pat. No. 3,511,469 to Bell. In this patent a deformable tube is placed between a pair of oppositely disposed plungers poised to normally pinch off the tube. The plungers are individually actuatable with separate solenoids to open the conduit.

In a number of high speed technologies a need exists for a high speed valve which is capable of conducting substantial fluid flows yet can be closed in a short instance for precision control. For example, in the printing of large surfaces, a need exists for a high speed valve which can be densely packaged with others and actuated using a relatively low amount of power to lay down an ink or dye pattern in an accurate manner.

For example, in the printing of a carpet a large number of valves may be necessary to print a dye pattern with an acceptable level of resolution. The number of valves can be extremely high if the printing requires deposition of dyes of desired colors on one-tenth inch centers over a total distance of the carpet width. When different dye colors are used, the number of valves for a single carpet printing may be of the order of thousands.

SUMMARY OF THE INVENTION

With a valve formed in accordance with the invention, a small, low power consuming, high speed reliably operating valve is achieved. The valve contemplates a drive element and a follower which are so mounted as to cooperatively move with each other in the control of the valve.

As described with respect to one normally closed valve in accordance with the invention, the drive element and follower are mounted to reciprocate between fluid flow inhibiting and enabling positions. The follower is urged in one reciprocating position, for example, into closure of the valve while being reciprocated under action by the drive element. When a valve actuation is desired, the follower is retained by a holder at a time when the follower is at its other reciprocated position. The drive element continues to reciprocate, but without the cooperative action from the follower to enable a flow of fluid through the conduit.

As further described, timing of valve actuation is such that the power to actuate the valve by holding of the follower can be kept very low. In this manner a large number of valves can be assembled without imposing excessive power demands.

When such large number of valves are employed, their individual reliability must be very good and individual power demands very low. If the valve further needs to be actuated very rapidly in the order of thousands of cycles per minute, the valve must be sufficiently light weight to reduce power requirements yet sturdy to provide the needed reliability and high operating speed capabilities.

The mass of the moving elements involved can be made very small to enable very high valve speeds. Valve cycles of the order of thousands per minute or an extended actuation over a long time period can be obtained in a reliable manner.

A valve formed in accordance with the invention is particularly suitable for computer control. A large number of the valves can be closely packaged, yet individually operated to dispense desired quantities of fluid to deposit a pattern under computer control.

It is, therefore, an object of the invention to provide a high speed valve, which is reliable, operable over a wide range of requirements, can be formed into a small size for assembly with many others and requires a small amount of power.

It is a further object of the invention to provide a method for actuating a valve at a high speed with relatively low power.

These and other advantages and objects of the invention can be understood from the following description of one embodiment in accordance with the invention described in conjunction with the drawings.

BRIEF DESCRIPTION OF DRAWINGS

FIGS. 1-5 are schematic representations of sequential operating positions of one valve in accordance with the invention;

DETAILED DESCRIPTION OF EMBODIMENT

Figure 6:
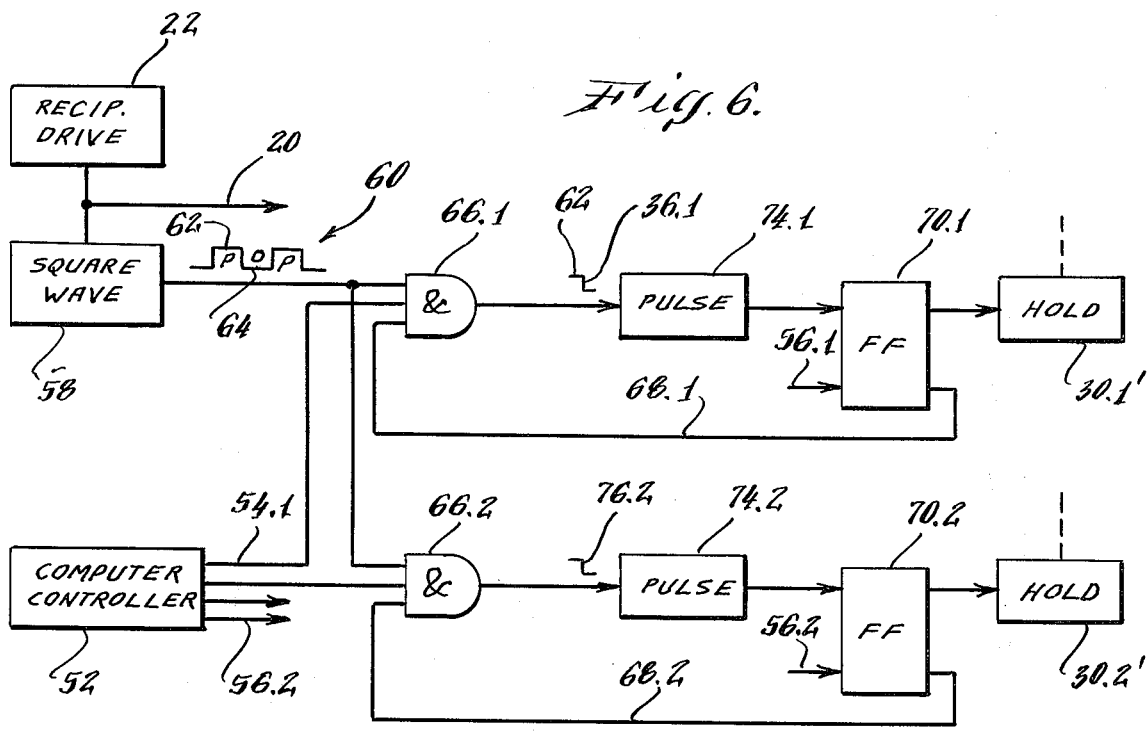
FIG. 6 is a block diagram for one control of a plurality of valves in accordance with the invention.

With reference to FIG. 1, a valve 10 is shown formed of the pinch tube type. A collapsible conduit 12 is provided in a housing 13 (partially shown) and a drive element 14 is operatively disposed to reciprocate along arrow 16 with respect to conduit 12. A reciprocating drive 18 is coupled to drive element 14. Reciprocating drives are well known and may be mechanical, electro-mechanical, pneumatic or hydraulic. In the embodiment, the reciprocating drive 18 is assumed to be of the electro-mechanical type actuated, for example, by an alternating current drive signal on output 20 from a drive 22 (see FIG. 2).

A follower 24 is shown mounted generally opposite the drive element 14 for reciprocation in the direction of double-headed arrow 16. A coupling device is provided with which follower 24 can be reciprocated by drive 18. In FIG. 1 the coupling device is in the form of a spring 26, which is anchored to housing 13 and seated on a shoulder 28 of follower 24 to urge it towards collapsible conduit 12.

A holder 30 is shown disposed in alignment with the follower 24 to hold it away from conduit 12 when the holder 30 is actuated. Holder 30 is shown as a simple solenoid which is energized to hold follower 24 when a switch 32 is closed. Closure of the switch 32 enables current from a battery 34 to energize the solenoid and seat the end 36 of follower 24 in abutment with the face 38 of solenoid holder 30.

The holder 30 can be formed of a more sophisticated and power efficient structure. The representation of FIG. 1 is used to illustrate the principle of the invention.

Holder 30 may also be formed of other types of actuators such as pneumatic, hydraulic and the like.

The drive element 14 and follower 24 are so disposed with respect to collapsible conduit 12 that each contributes to the pinching of tube 12. In the positions of elements 14, 24 in FIG. 1, drive element 14 is in its partial pinch position at one end of its stroke while follower 24 is in a complementary fluid flow inhibiting position. Thus, follower 24 during reciprocation, retains sufficient pinching engagement with conduit 12 to complement the pinching effect by drive element 14 so that both cooperate to inhibit fluid flow through conduit 12.

After the illustrated positions of drive element 14 and follower 24 in FIG. 1, the reciprocating drive 18 commences a return stroke for drive element 14 to an open or fluid flow enabling position. The coupling device in the form of spring 26 is sufficient to cause follower 24 to follow the return of drive element 14 while cooperating with the drive element to keep the conduit 12 pinched off. Hence, as shown in FIG. 2, at the end of the return stroke, drive element 14 remains in engagement with conduit 12 to provide a moving anvil against which follower 24 maintains conduit 12 pinched off.

The repetitive motion by drive element 14 continues in this manner at a rapid pace with conduit 12 being kept closed by the cooperative pinching relationship between the drive element 14 and follower 24. By keeping the mass of these small, low inertias are involved in the rapid reciprocation and high rates can be achieved.

To open valve 10, the holder 30 is activated at a time when the momentum of follower 24 is particularly favorable. One such occasion arises each time the follower 24 is driven to the end of its fluid flow enabling stroke as shown in FIGS. 1 and 3. In this position the follower 24 is about to reverse direction and may be almost at rest. At this time actuation of holder 30 by closure of switch 32 as shown in FIGS. 3 and 4 energizes the solenoid and prevents spring 26 from driving follower 24 back with drive element 14.

Hence, conduit 12 is permitted to open as drive element 14 is returned to its fluid flow enabling position as shown in FIG. 4. The pull of holder 30 is sufficient to seat end 36 of follower 24 onto face 38 of the solenoid as illustrated in FIG. 4. Thus, maintaining an opening 42 in conduit 12 even at the end of the pinch stroke of drive element 14 as shown in FIG. 5.

The speed with which valve 10 may be operated can be appreciated with reference to the waveforms 44 depicted adjacent the valve 10 in FIGS. 1-5. The waveforms 44 represent the reciprocal motion of the drive element 14 and are illustrated as sinusoidal though the actual reciprocal motion of the drive element may differ from sinusoidal.

At 46, the drive element is at the end of its return stroke as shown in FIGS. 2 and 4 and proceeds to the partial fluid flow inhibiting position reached at 48. This back and forth motion is repeated until at 48 in waveform 44.3 switch 32 is closed.

The dashed line 49 delineating one end of the shaded segment covering waveform segments 44.4 and 44.5 in FIGS. 4 and 5 represents the time when valve 10 is opened. The duration of the opening can be made very brief by prompt release by holder 30 of the follower through the opening of switch 32. The duration can also be made as long as desired by delaying such switch opening.

A valve in accordance with the invention is particularly suited in a multiple valve arrangement. The main power for drive of a large number of valves can originate from a common drive source such as a mechanical cam or pneumatic or hydraulic reciprocator coupled to a plurality of drive elements 14.

Individual valve control may be exercised with a very low power hold drive 30 such as small solenoids or pneumatic drives. FIG. 6 illustrates a schematic arrangement of a control 50 for controlling a large number of valves.

Control 50 includes a computer or microprocessor 52 which has an output register (not shown) generating a pair of signals on lines 54 and 56 to respectively actuate or deactivate a holder 30. Instructions for generating these signals are selected for such purposes as valves 10 may be used.

The reciprocating drive 20 generates a reciprocating signal, such as a sinusoidal waveform for an electromagnetic reciprocator. A network 58 converts the reciprocating signal into a square wave 60 formed of altnerating pinching pulses 62 and valve opening pulses 64.

The squarewave 60 is applied to AND gates 66 together with control signals on lines 54 and reset lines 68 from control flip-flops 70. When all signals to an AND gate 66 are active, a pinch pulse 62 is reproduced on output 72 to activate a pulse network 74 with the trailing edge 76 of pulse 62. Pulse network 74 causes a brief pulse to set a flip-flop 70 which, in turn, activates a hold network 30'. The setting of flip-flop 70 immediately disables AND gate 66 until a valve closing signal appears on input line 56.1 to reset flip-flop 70.

Hence, controller 52 may provide control over each valve 10. The actuation of a hold network 30' is synchronized with the time when the least amount of power is needed to change the state of a valve 10.

Having thus described a valve in accordance with the invention, its advantages can be appreciated. Actuation of a valve can be accomplished with very small power levels yet at very high speeds. With the use of small valve elements, a high packaging density can be achieved. Variations of the valve can be implemented by one skilled in the art.

Figure 7:
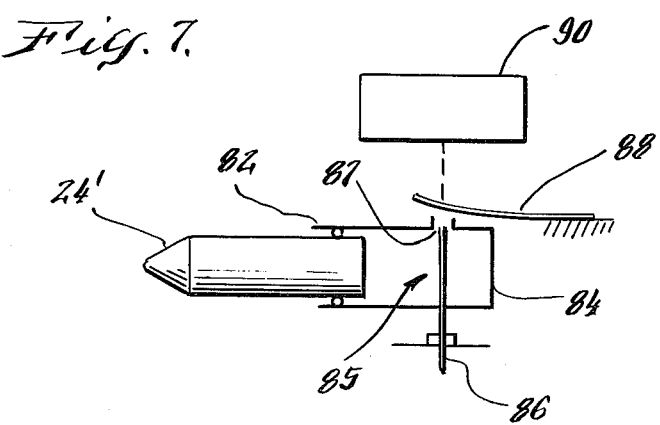
FIG. 7 is a schematic representation of a pneumatically operated follower for use in a valve in accordance with the invention.

For example, a normally open valve can be formed with a pneumatic control 80 as shown in FIG. 7. A follower 24' is shown mounted for reciprocation as a piston in a cylinder 82. Pressure in the chamber 84 behind follower 24' is controlled with a venturi 85 formed with a conduit 86 supplying air from a supply (not shown) through a pressure control port 87 in cylinder 82. A flapper 88 is mounted over port 87 to either open or close port 87 with an actuator 90. When the flapper 88 is up, or opens port 87, a vacuum is created in chamber 84 to draw follower 24' away from conduit 12. When flapper 88 is down, or closes port 87, chamber 84 is pressurized to drive follower 24' against a conduit 12.

Port 87 can be made small so that a small movement (of the order of 0.001 inch) of flapper 88 can be sufficient to operate the follower 24'. For example, flapper 88 can be made of a piezo electric element which is moved by applying a voltage across it by actuator 90. Other actuators can be used to move flapper 88. Flapper 88 may operate as shown or be mounted on edge.

Spring 26 can be replaced with a positive releasable coupling between reciprocating drive 18 or drive element 14 and follower 24. Such coupling is disengaged from drive element 14 at just the right time in the reciprocating cycle for low power requirements to provide also a proper retention of follower 24 in the valve actuated state.

The valve 10 may also be implemented in a different form such as with a rotating undulating cam surface disposed to partially close the end of a non-collapsible conduit. A follower is urged into contact with the cam to provide complementary and complete closure of the opening of the conduit while the cam is rotated. Actuation of such valve by holding the follower at a proper instant, in its reciprocation may be done as described.

Variations of the described embodiment may thus be implemented with the scope of the invention to be determined by the following claims.

What is claimed is:

1. A valve for controlling fluid flow through a conduit comprising
    a drive element operatively disposed relative to the conduit for repetitive movement between partial fluid flow inhibiting and enabling positions;
    means for operatively moving said drive element repetitively between said positions;
    a follower mounted generally opposite the drive element to move between fluid flow inhibiting and enabling positions which are complementary to the fluid flow inhibiting and enabling positions of the drive element to effect fluid flow control through the conduit;
    means for effectively coupling said follower to the moving means for cooperative repetitive movement with the drive element between said complementary positions;
    holding means for retaining said follower in one of said complementary positions for a time period selected to alter the flow of fluid through the conduit; and
    means for actuating said holding means and interrupt said cooperative movement between the follower and the drive element when said follower is driven to said one complementary position.

2. The valve as claimed in claim 1 wherein said actuating means further includes
    means for generating a hold signal indicative of when said follower is driven to said one complementary position and applying said hold signal to the holding means when an alteration in the flow of fluid through the conduit is required.

3. A valve for controlling fluid flow through a conduit comprising
    a collapsible conduit through which fluid is to be moved;
    a drive element disposed to reciprocate relative to the conduit with pinching engagement with the conduit at one reciprocated position and fluid flow enabling through the conduit at an opposite reciprocated position;
    a follower disposed relative to the conduit with pinching engagement with the conduit at one reciprocated position and fluid flow enabling through the conduit at an opposite reciprocated position;
    said drive element and follower being generally oppositely located relative to each other for cooperative pinch control over the conduit;
    means for reciprocating the drive element;
    means for coupling the follower to the reciprocating means for cooperative reciprocating movement with the drive element between the reciprocating positions of the follower; and
    means for interrupting said coupling means when the follower is at a predetermined position in its reciprocating stroke.

4. The valve as claimed in claim 3 wherein said interrupting means further includes holding means for retaining said follower in the other of its reciprocating positions for a desired time period for fluid flow control through the collapsible conduit.

5. The valve as claimed in claim 4 wherein the interrupting means still further includes means for actuating said holding means when the follower is at said other reciprocated position.

6. The valve as claimed in claim 5 wherein the actuating means further includes
    means for generating a reciprocating drive signal; and
    means responsive to the reciprocating drive signal for producing a hold signal commensurate when said follower element is at said other reciprocated position.

7. The valve as claimed in claim 3 wherein said coupling means further includes
    a cylinder having a pressure control port with said follower operatively disposed to reciprocate in said cylinder according to cylinder pressure;
    a flapper operatively disposed to open and close the pressure control port; and
    pressurizing means for evacuating said cylinder when the flapper opens said pressure control port and pressurize the cylinder when the flapper closes said pressure control port.

8. The valve as claimed in claim 7 wherein said pressurizing means is formed of a venturi operatively disposed with respect to said pressure control port.

9. The valve as claimed in claim 8 wherein said flapper is formed of a piezo electric element.

10. A method for operating a valve at a high speed comprising
    reciprocating a drive element relative to a conduit to partially close and open said conduit;
    reciprocating a follower in cooperative relationship with the drive element to provide a complementary closure of said conduit; and
    holding said follower for actuation of the valve effectively when said follower has been moved to one of its reciprocated end positions.

11. The method for operating a valve as claimed in claim 10 wherein said holding step further includes retaining said follower when said follower has been reciprocated to a fluid flow enabling position.

* * * * *